US009857725B2

(12) United States Patent
Imai et al.

(10) Patent No.: US 9,857,725 B2
(45) Date of Patent: *Jan. 2, 2018

(54) ELECTROPHOTOGRAPHIC DEVICE MEMBER

(71) Applicant: SUMITOMO RIKO COMPANY LIMITED, Komaki-shi, Aichi (JP)

(72) Inventors: Kentaro Imai, Aichi (JP); Yosuke Hayashi, Aichi (JP); Masanori Ishida, Aichi (JP); Fumio Misumi, Shizuoka (JP); Masanori Satou, Shizuoka (JP); Toshihiko Arata, Shizuoka (JP); Atsushi Ozaki, Shizuoka (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 337 days.

This patent is subject to a terminal disclaimer.

(21) Appl. No.: 14/703,415

(22) Filed: May 4, 2015

(65) Prior Publication Data

US 2015/0234311 A1 Aug. 20, 2015

Related U.S. Application Data

(63) Continuation of application No. PCT/JP2013/081839, filed on Nov. 27, 2013.

(30) Foreign Application Priority Data

Nov. 30, 2012 (JP) .................................. 2012-261995
Jul. 30, 2013 (JP) .................................. 2013-157767

(51) Int. Cl.

| G03G 15/05 | (2006.01) |
|---|---|
| G03G 15/06 | (2006.01) |
| G03G 15/14 | (2006.01) |
| C08L 33/08 | (2006.01) |
| C08L 9/02 | (2006.01) |
| C08L 75/04 | (2006.01) |

(52) U.S. Cl.

CPC ............ *G03G 15/05* (2013.01); *C08L 9/02* (2013.01); *C08L 33/08* (2013.01); *C08L 75/04* (2013.01); *G03G 15/06* (2013.01); *G03G 15/14* (2013.01)

(58) Field of Classification Search

None
See application file for complete search history.

(56) References Cited

U.S. PATENT DOCUMENTS 9,436,151 B2 * 9/2016 Hayashi ................ C08G 77/38

FOREIGN PATENT DOCUMENTS

| JP | 3111868 B2 | 11/2000 |
|---|---|---|
| JP | 2002-298647 A | 10/2002 |
| JP | 2002-318485 A | 10/2002 |
| JP | 2003-3032 A | 1/2003 |
| JP | 2003-140417 A | 5/2003 |
| JP | 2006-99099 A | 4/2006 |
| JP | 2008-233331 A | 10/2008 |
| JP | 2008-249985 A | 10/2008 |

OTHER PUBLICATIONS

International Preliminary Report on Patentability (Form PCT/IB/373) of Application No. PCT/JP2013/081839 dated Jun. 2, 2015, with Form PCT/ISA/237 (English translation) (5 pages).
International Search Report dated Jan. 14, 2014, issued in corresponding application No. PCT/JP2013/081839.
Decision of Refusal dated Jan. 31, 2017, issued in counterpart Japanese Patent Application No. 2013-157767, with English translation. (4 pages).
Notification of Reasons for Refusal dated Nov. 15, 2016, issued in counterpart Japanese Patent Application No. 2013-157767, with English translation. (18 pages).

* cited by examiner

*Primary Examiner* — Sheeba Ahmed

(74) *Attorney, Agent, or Firm* — Westerman, Hattori, Daniels & Adrian, LLP

(57) ABSTRACT

An electrophotographic device member R is used in an electrophotographic device. The electrophotographic device member R has a surface layer 1. The surface layer 1 has a matrix polymer 11 forming a skeleton of the surface layer 1 and a surface modifier 12 contained in the matrix polymer 11. The surface modifier 12 is composed of a copolymer containing, in its molecule, a first polymerization unit derived from a (meth)acrylate having a silicone group 121 and a second polymerization unit derived from a (meth)acrylate having a fluorine-containing group 122.

20 Claims, 3 Drawing Sheets

ELECTROPHOTOGRAPHIC DEVICE MEMBER

TECHNICAL FIELD

The present invention relates to an electrophotographic device member.

BACKGROUND ART

An electrophotographic device such as a copier, a printer, and a facsimile machine of an electrophotographic system has hitherto been known. Such an electrophotographic device forms images through steps such as latent image formation by exposing a charged photoreceptor with light through image data, development, transfer to a transfer medium, and fixing. For this purpose, various electrophotographic device members are incorporated into the electrophotographic device in order to achieve these steps.

For example, a roll-shaped charging member is incorporated in order to charge the surface of a photoreceptor. Further, a roll-shaped developing member is incorporated in order to make toner adhere to an electrostatic latent image formed on the surface of a photoreceptor to form a visible image. Recently, a belt-shaped intermediate transferring member has been used in order to primarily transfer toner images formed separately by color with a plurality of photoreceptors to the surface of a belt, superpose the toner images of each color, and secondarily transfer the superposed image to paper.

Such an electrophotographic device member is generally arranged in the state of being in contact with a predetermined counterpart member in order to achieve its function in the electrophotographic device. For example, a blade member is often in contact with the surface of a developing member in order to charge toner by rubbing. Further, a blade member is often in contact with the surface of a charging member in order to remove toner remaining on the surface after fixing toner images to paper. Furthermore, in an intermediate transferring member, a blade member may be brought into contact with the surface in order to remove toner remaining on the surface after transfer of toner images. In this way, various electrophotographic device members are often used in contact with the counterpart member in the presence of toner.

With respect to the electrophotographic device member, an attempt of imparting functions such as slidability with the counterpart member and a property in which the toner in contact with the surface of the member tends to be separated, so called a toner releasability, has hitherto been made by providing a surface layer on the surface of the member.

Generally, in order to improve slidability with the counterpart member, a silicone-based surface modifier is often added to the surface layer. Further, in order to improve the toner releasability, a fluorine-based surface modifier is often added to the surface layer.

Note that, as prior art on the surface modification of an electrophotographic device member, Patent Literature 1, for example, discloses a technique of forming the outermost layer of a developing roll using a coating liquid prepared by formulating a reactive silicone oil and a reactive fluorine oil into a fluororubber dissolved in a solvent.

PRIOR ART DOCUMENT

Patent Document

Patent Document 1: JP-B-3111868

SUMMARY OF THE INVENTION

Problem to be Solved by the Invention

However, conventional common techniques have problems in the following points. When the silicone-based surface modifier is added to a surface layer, slidability with the counterpart member can be improved. However, the toner releasability of the surface of the surface layer is significantly reduced. On the other hand, when the fluorine-based surface modifier is added to a surface layer, the toner releasability can be improved. However, slidability with the counterpart member is extremely reduced. Furthermore, there is a problem that even when both the silicone-based surface modifier and the fluorine-based surface modifier are added to a surface layer, it is difficult to impart both properties of slidability and toner releasability of the surface of a surface layer.

The present invention has been made in view of the above background and obtained so as to provide an electrophotographic device member that can attain both properties of slidability and toner releasability of the surface of a surface layer.

Means for Solving the Problem

One aspect of the present invention provides an electrophotographic device member having a surface layer for use in an electrophotographic device. The surface layer contains a matrix polymer forming a skeleton of the surface layer and a surface modifier contained in the matrix polymer. The surface modifier is composed of a copolymer containing, in its molecule, a first polymerization unit derived from a (meth)acrylate having a silicone group, and a second polymerization unit derived from a (meth)acrylate having a fluorine-containing group.

Effects of the Invention

When both a silicone-based surface modifier and a fluorine-based surface modifier are added to a surface layer, both the surface modifiers are hardly mixed with each other because they are poorly compatible with each other, and a priority is formed between the surface modifiers coming out to the surface of a surface layer. That is, it is difficult to allow both the surface modifiers to coexist on the surface of a surface layer in this case, and only the effect of one of the surface modifiers is obtained. Depending on the case, the effects of both the surface modifiers may not be sufficiently obtained.

On the other hand, the electrophotographic device member contains the surface modifier composed of the copolymer containing the above specific polymerization units in the matrix polymer forming the skeleton of the surface layer. Therefore, the electrophotographic device member can force the silicone group of the first polymerization unit and the fluorine-containing group of the second polymerization unit to be present on the surface of a surface layer. Consequently, the electrophotographic device member can attain both properties of slidability and toner releasability of the surface of a surface layer.

MODE FOR CARRYING OUT THE INVENTION

Figure 1:
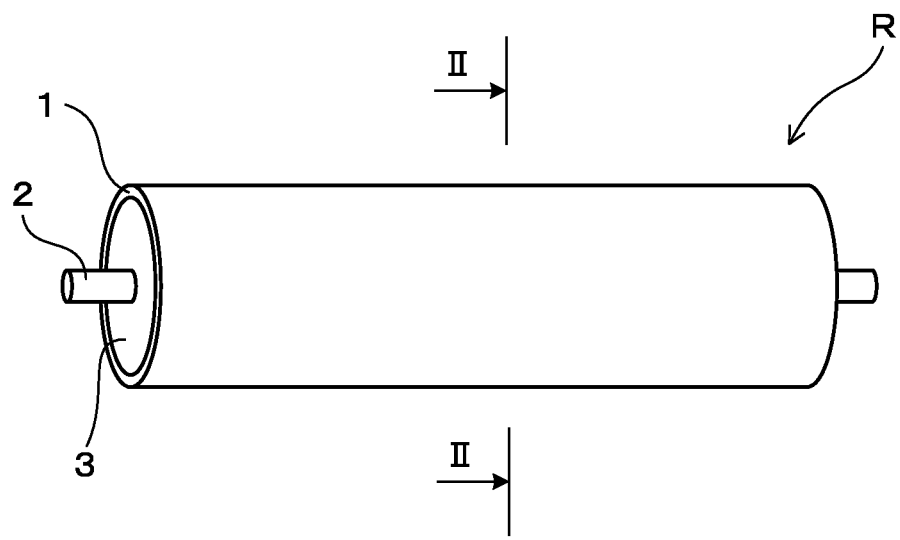
FIG. 1 schematically illustrates the electrophotographic device member of Example 1.

The electrophotographic device member is a member used in an electrophotographic device. Specific examples of the electrophotographic device include image forming devices employing an electrophotographic system using a charged image, such as a copier, a printer, a facsimile machine, a multifunction machine, and a POD (Print On Demand) machine.

The electrophotographic device member can be used in the state where other counterpart members used in the electrophotographic device are in contact with the surface of a surface layer in the presence of toner. Examples of the counterpart members include a blade member and a roll member which are disposed around the electrophotographic device member. In this case, the sliding movement of the counterpart members can be stabilized because the electrophotographic device member is excellent in slidability of the surface of a surface layer. Further, since the electrophotographic device member is excellent in toner releasability of the surface of a surface layer, toner hardly remains adhered to the surface of a surface layer. Particularly, when the electrophotographic device is an image forming device, there is an advantage of easily forming good images. Further, when the counterpart member is a blade member, a problem of curling up of the blade member is also easily suppressed, which is advantageous for forming good images.

Specifically, the electrophotographic device member may be a developing member, a charging member, or a transferring member to be incorporated into the image forming device of the electrophotographic system. The developing member, charging member, or transferring member is often used in contact with a counterpart member such as a blade member. Therefore, the above effect can sufficiently be exhibited in this case. Note that specific examples of the transferring member include the intermediate transferring member, in which a toner image supported by a photoreceptor is primarily transferred to the intermediate transferring member, and the toner image is secondarily transferred from the intermediate transferring member to a transfer material such as paper.

Here, the surface layer of the electrophotographic device member contains a matrix polymer for forming the skeleton of the surface layer and a surface modifier contained in the matrix polymer.

The matrix polymer plays an important role as a polymer component for forming a basic skeleton of the surface layer. The matrix polymer is not particularly limited as long as it can play the above role, and various resins and rubber (an elastomer is also included in the rubber, the description of which is omitted hereinafter) can be used. These resins and rubber can be used alone or in combination, and the optimum material can be selected depending on the applications of the electrophotographic device member.

Examples of the resin which can be used include various thermoplastic resins and mixed polymers of thermoplastic resins and thermosetting resins. Specific examples of the resins include urethane resins; urethane silicone resins; urethane fluororesin; polyamide resins; polyimide resins; (meth)acrylic resins; (meth)acrylic silicone resins; (meth) acrylic fluororesin; fluororesin; acetal resins; alkyd resins; polyester resins; polyether resins; carbonate resins; phenolic resins; epoxy resins; polyvinyl alcohol; polyvinyl pyrrolidone; cellulosic resins such as carboxymethyl cellulose, hydroxyethyl cellulose, and hydroxypropyl cellulose; polyacrylamide; polyethylene oxide; polyethylene glycol; polypropylene glycol; polyvinyl methyl ether; polyamine; polyethyleneimine; casein, gelatin, starch, and their copolymers; olefinic resins such as polyethylene, polypropylene, and their copolymer resins with other olefinic monomers; vinyl chloride resins; styrenic resins such as polystyrene and acrylonitrile-styrene copolymer resins; vinyl chloride-vinyl acetate copolymer resins; polyvinyl acetal resin such as polyvinyl butyral resin and its derivatives or modified forms; polyisobutylene; polytetrahydrofuran; polyaniline; acrylonitrile-butadiene-styrene copolymers (ABS resins); polyisoprene; polydiens such as polybutadiene; polysiloxanes such as polydimethylsiloxane; polysulfones; polyimines; polyacetic anhydrides; polyureas; polysulfides; polyphosphazenes; polyketones; polyphenylenes; polyhaloolefins and their derivatives; and melamine resins. Among these resins, urethane resins, urethane silicone resins, urethane fluororesin, and the like can be preferably used in terms of improvement in flexibility, improvement in wear resistance, and the like of a surface layer.

Further, specific examples of the rubber include acrylonitrile-butadiene rubber (NBR), butadiene rubber (BR), styrene-butadiene rubber (SBR), butyl rubber (IIR), chloroprene rubber (CR), epichlorohydrin rubber (ECO, CO), isoprene rubber (IR), urethane rubber (U), silicone rubber (Q), ethylene-propylene-diene rubber (EPDM), natural rubber (NR), and their modified forms. Among these rubber, acrylonitrile-butadiene rubber (NBR), urethane rubber (U), their modified forms, and the like can be preferably used in terms of improvement in flexibility, improvement in wear resistance, and the like of a surface layer.

On the other hand, a surface modifier contained in the matrix polymer plays an important role as a component that is present on the surface of a surface layer to modify the surface of the surface layer to impart slidability and toner releasability to the surface of the surface layer. The surface modifier is composed of a copolymer containing, in its molecule, a first polymerization unit derived from a (meth) acrylate having a silicone group and a second polymerization unit derived from a (meth)acrylate having a fluorine-containing group. Note that the term "fluorine-containing group" refers to a group containing a fluorine atom, including —F. Note that in the present application, (meth)acrylic is a meaning including both acrylic and methacrylic. Similarly, (meth)acrylate is a meaning including both acrylate and methacrylate (hereinafter, the description will be omitted).

The surface modifier can contain one or more first polymerization units and one or more second polymerization units. Further, the surface modifier can be used alone or in combination. Furthermore, the surface modifier may be composed of a random copolymer or a block copolymer. The surface modifier is preferably composed of a random copolymer. In this case, the silicone groups in the first polymerization units and the fluorine-containing groups in the second polymerization units are easily allowed to be present at random on the surface of the surface layer. Therefore, in this case, there is an advantage that the unevenness of slidability and toner releasability on the surface of the surface layer hardly occur. Further, the surface modifier may have a linear or branched polymer structure.

In the surface modifier, the (meth)acrylate having a silicone group may have one or more silicone groups. Specifically, for example, the silicone group can contain a polydimethylsiloxane skeleton formed by repetition of a dimethylsiloxane unit. In this case, the slidability of the surface of a surface layer can be easily secured because the molecular weight of the silicone group can be increased by a polydimethylsiloxane skeleton having a relatively simple molecular structure.

The polydimethylsiloxane skeleton may have a weight average molecular weight of preferably 275 or more, more preferably 350 or more, further preferably 420 or more, in terms of the improvement in slidability of the surface of a surface layer and the like. Further, the polydimethylsiloxane skeleton may have a weight average molecular weight of preferably 20000 or less, more preferably 15000 or less, further preferably 12000 or less, in terms of the reactivity during synthesis such as the reactivity of a (meth)acrylic group, the solubility of a surface layer-forming material in the solvent, and the like. Note that the weight average molecular weight can be measured by gel permeation chromatography (GPC).

In the surface modifier, the (meth)acrylate having a fluorine-containing group may have one or more fluorine-containing groups. Specific examples of the fluorine-containing group include a fluoroalkyl group, a fluoroalkyl alkyleneoxide group, a fluoroalkenyl group, and —F.

Among these, a fluoroalkyl group, preferably a fluoroalkyl group having about 4 to 12 carbon atoms, can be suitably used as the fluorine-containing group in terms of toner releasability, availability of the (meth)acrylate having a fluorine-containing group, and the like. In the fluoroalkyl group, all the hydrogen atoms of the alkyl group may be fluorinated, or the fluoroalkyl group may contain a part that is partially fluorinated. The former refers to a perfluorinated group, and the latter refers to a partially fluorinated group. The fluoroalkyl group is particularly preferably a perfluoroalkyl group. This is because, since the perfluoroalkyl group has high structural stability, toner is hardly kept adhered thereto, and the toner releasability of the surface of a surface layer is easily improved.

Specific examples of the fluoroalkyl group include trifluoromethyl, trifluoroethyl, trifluorobutyl, pentafluoropropyl, perfluorobutyl, perfluorohexyl, perfluorooctyl, perfluorodecyl, perfluoro-3-methylbutyl, perfluoro-5-methylhexyl, perfluoro-7-methyloctyl, octafluoropentyl, dodecafluoroheptyl, and hexadecafluorononyl.

In the surface modifier, the silicone group preferably contains a polydimethylsiloxane skeleton formed by repetition of a dimethylsiloxane unit, and the fluorine-containing group is preferably a perfluoroalkyl group. In this case, an electrophotographic device member excellent in both properties of slidability and toner releasability of the surface of a surface layer can be easily obtained.

In the surface modifier, the (meth)acrylate having a silicone group may be more specifically a compound represented by the following formula 1, and the (meth)acrylate having a fluorine-containing group may be more specifically a compound represented by the following formula 2.

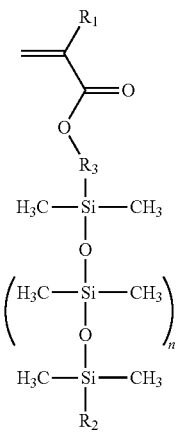

(Formula 1)

(wherein $R_1$ represents H or $CH_3$;

$R_2$ represents an alkyl group;

$R_3$ represents an alkyl group or

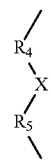

$R_4$ and $R_5$ each represent an alkyl group;

X represents an ester bond, a urethane bond, a urea bond, or an amide bond; and n represents an integer of 2 to 270.)

In the formula 1, $R_2$ is preferably an alkyl group having 1 to 10 carbon atoms, more preferably a methyl group, an ethyl group, a propyl group, or a butyl group, in terms of reactivity during synthesis such as reactivity of a (meth)acrylic group and the like. Further, in formula 1, the alkyl group as a skeleton that can form $R_3$ is preferably an alkyl group having 1 to 10 carbon atoms, more preferably a methyl group, an ethyl group, a propyl group, or a butyl group, in terms of reactivity during synthesis such as reactivity of a (meth)acrylic group and the like; the alkyl group as a skeleton that can form $R_4$ and $R_5$ is preferably an alkyl group having 1 to 10 carbon atoms, more preferably a methyl group, an ethyl group, a propyl group, or a butyl group, in terms of reactivity during synthesis such as reactivity of a (meth)acrylic group and the like; and X is preferably a urethane bond, a urea bond, an amide bond, or an ester bond in terms of reactivity when dimethylsiloxane having a silanol group or another modified dimethylsiloxane is added (synthesized) to acrylic acid or modified acrylic acid, and the like. The modified acrylic acid is, for example, a compound in which a functional group having high reactivity is added to acrylic acid. The modified dimethylsiloxane is, for example, a compound in which dimethylsiloxane having a silanol group is modified so as to have reactivity with an acrylic acid terminal. Further, n is preferably an integer of 2 to 270, more preferably 5 to 160, in terms of reactivity during synthesis, slidability, and the like.

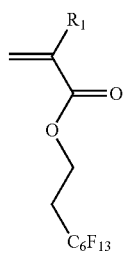

(Formula 2)

(wherein $R_1$ represents H or $CH_3$.)

Since the compounds represented by the above formula 1 and formula 2 are relatively easily available, these compounds can relatively easily synthesize the surface modifier. Therefore, in this case, an electrophotographic device member having the above effect can be easily obtained.

The surface modifier can contain a first polymerization unit in an amount of 0.01 to 60 mol % and a second polymerization unit in an amount of 0.01 to 60 mol %. In these cases, both slidability and toner releasability of the surface of a surface layer can be secured. Further, by adjusting the proportion of each polymerization unit of the surface modifier within the above range, the amounts of a silicone group and a fluorine-containing group can be adjusted to control the balance of both properties. Note that the percentages of the first polymerization unit and the second polymerization unit can be selected so that the total percentage including the first polymerization unit, the second polymerization unit, and other polymerization units to be described below (if any other polymerization units are contained) may be 100 mol %.

The percentage of the first polymerization unit may be preferably 0.05 mol % or more, more preferably 0.1 mol % or more, further preferably 0.3 mol % or more, in terms of obtaining sufficient slidability. Further, the percentage of the first polymerization unit is preferably 50 mol % or less, more preferably 35 mol % or less, further preferably 10 mol % or less, in terms of solubility in a matrix polymer and a diluting solvent. On the other hand, the percentage of the second polymerization unit may be preferably 0.05 mol % or more, more preferably 0.1 mol % or more, further preferably 0.3 mol % or more, in terms of obtaining sufficient toner releasability. Further, the percentage of the second polymerization unit may be preferably 50 mol % or less, more preferably 45 mol % or less, further preferably 30 mol % or less, in terms of solubility in a matrix polymer and a diluting solvent. Note that the percentage of the above polymerization units can be measured by thermal decomposition GC/MS analysis, NMR analysis, and the like.

The surface modifier can optionally contain one or more polymerization units derived from other (meth)acrylates in addition to the first polymerization unit and the second polymerization unit.

For example, the surface modifier can further contain, in its molecule, a third polymerization unit derived from a (meth)acrylate having an alkyl group and/or a fourth polymerization unit derived from a (meth)acrylate having a hydroxy group. Note that the surface modifier can contain one or more third polymerization units and one or more fourth polymerization units.

In this case, the compatibility between a matrix polymer and a surface modifier can be improved by the alkyl group in the third polymerization unit and/or the hydroxy group in the fourth polymerization unit. Therefore, in this case, it is easy to allow the surface modifier to be present relatively uniformly on the surface of a surface layer, and there is an advantage that the unevenness of slidability and toner releasability on the surface of a surface layer hardly occur.

Particularly, when the matrix polymer contains a urethane bond, the above effect is large.

In the surface modifier, the (meth)acrylate having an alkyl group can have one or more alkyl groups. Specific examples of the alkyl group include a methyl group, an ethyl group, a propyl group, a butyl group, a pentyl group, and a hexyl group in terms of improvement in compatibility with a matrix polymer and the like. Among these, the alkyl group is preferably a methyl group, an ethyl group, a propyl group, or a butyl group in terms of reactivity during synthesis such as reactivity of a (meth)acrylic group and the like.

In the surface modifier, specific examples of the (meth)acrylate having a hydroxy group include 2-hydroxyethyl methacrylate, hydroxyethyl (meth)acrylate, hydroxypropyl (meth)acrylate, hydroxybutyl (meth)acrylate, ethylene oxide-modified (meth)acrylate, and hydroxyethyl (meth)acrylamide. The (meth)acrylate having a hydroxy group may be more specifically a compound represented by the following formula 3 and/or a compound represented by the following formula 4, for example, in terms of reactivity during synthesis such as reactivity of a (meth)acrylic group, compatibility with a binder, and the like.

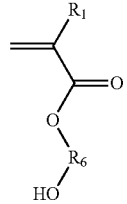

(Formula 3)

(wherein $R_1$ represents H or $CH_3$; and
$R_6$ represents an alkyl group, an aryl group, or an aralkyl group.)

In the formula 3, the alkyl group as a skeleton that can form $R_6$ is preferably an alkyl group having 1 to 10 carbon atoms, more preferably a methyl group, an ethyl group, a propyl group, or a butyl group in terms of reactivity during synthesis such as reactivity of a (meth)acrylic group and the like. The aryl group as a skeleton that can form $R_6$ is preferably a phenyl group or benzyl group in terms of reactivity during synthesis such as reactivity of a (meth) acrylic group, compatibility with a binder, and the like. The aralkyl group as a skeleton that can form $R_6$ is preferably a benzyl group or a phenethyl group in terms of reactivity during synthesis such as reactivity of a (meth)acrylic group, compatibility with a binder, and the like.

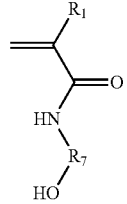

(Formula 4)

(wherein $R_1$ represents H or $CH_3$; and
$R_7$ represents an alkyl group, an aryl group, or an aralkyl group.)

In the formula 4, the alkyl group as a skeleton that can form $R_7$ is preferably an alkyl group having 1 to 10 carbon atoms, more preferably a methyl group, an ethyl group, a propyl group, or a butyl group in terms of reactivity during synthesis such as reactivity of a (meth)acrylic group and the like. The aryl group as a skeleton that can form $R_7$ is preferably a phenyl group or benzyl group in terms of reactivity during synthesis such as reactivity of a (meth)

acrylic group, compatibility with a binder, and the like. The aralkyl group as a skeleton that can form $R_7$ is preferably a benzyl group or a phenethyl group in terms of reactivity during synthesis such as reactivity of a (meth)acrylic group, compatibility with a binder, and the like.

In the surface modifier, the (meth)acrylate having an alkyl group may be more specifically methyl methacrylate or butyl methacrylate, and the (meth)acrylate having a hydroxy group may be more specifically hydroxyethyl methacrylate.

In this case, these methacrylates are easily copolymerized with a first polymerization unit and a second polymerization unit, and the compatibility between a matrix polymer and a surface modifier is also easily improved, allowing the above effect to be easily obtained.

The surface modifier can contain the third polymerization unit in an amount of 0 to 95 mol % and the fourth polymerization unit in an amount of 0 to 95 mol %. The percentage of the third polymerization unit may be preferably 10 mol % or more, more preferably 30 mol % or more, further preferably 50 mol % or more in terms of easily securing compatibility with a matrix polymer and the like. Further, the percentage of the third polymerization unit may be preferably 94 mol % or less, more preferably 93 mol % or less, further preferably 90 mol % or less in terms of securing the percentages of the first polymerization unit and the second polymerization unit for the development of the effect and the like. On the other hand, the percentage of the fourth polymerization unit may be preferably 10 mol % or more, more preferably 30 mol % or more, further preferably 50 mol % or more in terms of easily securing compatibility with a matrix polymer and the like. Further, the percentage of the fourth polymerization unit may be preferably 94 mol % or less, more preferably 93 mol % or less, further preferably 90 mol % or less in terms of securing the percentages of the first polymerization unit and the second polymerization unit for the development of the effect and the like.

The surface modifier can further contain, in its molecule, a fifth polymerization unit derived from a (meth)acrylate having a functional group different from a silicone group and a fluorine-containing group.

In this case, in addition to slidability and toner releasability, a function resulting from the functional group can be imparted to the surface of a surface layer, and the functionality of the surface of a surface layer can be improved. The (meth)acrylate having a functional group different from a silicone group and a fluorine-containing group can contain one or more functional groups. Further, in this case, the surface modifier can contain one or more fifth polymerization units.

Specifically, the functional group may be at least one kind selected, for example, from an ester group, an ether group, an amide group, an amino group, a carboxylic acid group, a sulfonic acid group, and a phenyl group.

Among the functional groups, for example, the amide group and the amino group can impart chargeability to the surface of a surface layer. Therefore, in this case, the surface of the surface layer can have toner chargeability to negatively charged toner in addition to slidability and toner releasability. Further, among the functional groups, for example, the carboxylic acid group and the sulfonic acid group also can impart chargeability to the surface of a surface layer. Therefore, in this case, the surface of the surface layer can have toner chargeability to positively charged toner. Further, among the functional groups, the ether group and the ester group, for example, are effective in reducing electrical resistance.

Further, the surface modifier can further contain, in its molecule, a sixth polymerization unit derived from a (meth)acrylate in which an ion conducting agent such as a quaternary ammonium salt is incorporated into the molecule. This case is advantageous to impart chargeability to a surface layer.

More specifically, the surface modifier may be formed of one or more selected from a compound having a molecular structure represented by the following formula 5.

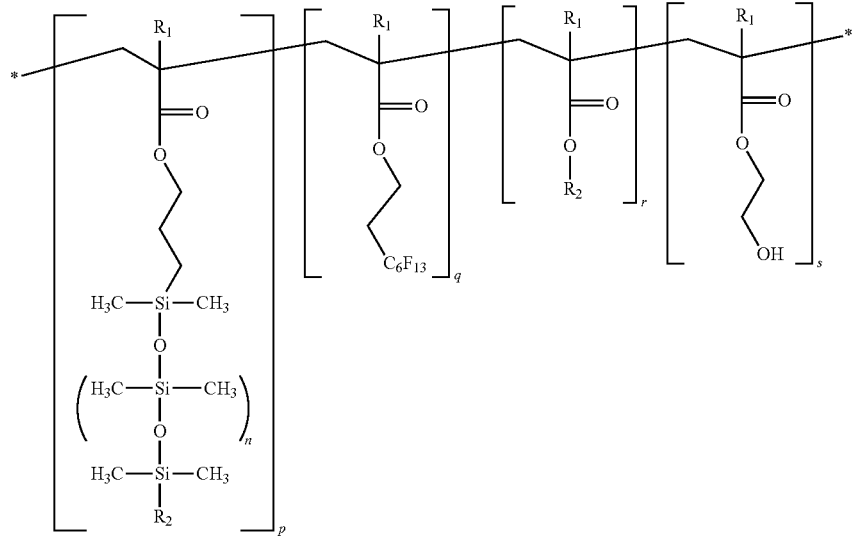

(Formula 5)

(wherein $R_1$ represents H or $CH_3$;

$R_2$ represents an alkyl group;

p is 0.01 to 60, q is 0.01 to 60, r is 0 to 95, and s is 0 to 95, by mol %; and n is an integer of 2 to 270.)

In the formula 5, $R_2$ is preferably an alkyl group having 1 to 10 carbon atoms, more preferably a methyl group, an ethyl group, a propyl group, or a butyl group in terms of reactivity during synthesis such as reactivity of a (meth) acrylic group and the like. Further, for the reason as described above, p may be 0.01 or more, preferably 0.05 or more, more preferably 0.1 or more, further preferably 0.3 or more, by mol %. By mol %, p may be 60 or less, preferably 50 or less, more preferably 35 or less, further preferably 10 or less. Further, q may be 0.01 or more, preferably 0.05 or more, more preferably 0.1 or more, further preferably 0.3 or more, by mol %. By mol %, q may be 60 or less, preferably 50 or less, more preferably 45 or less, further preferably 30 or less. Further, r may be 0 or more, preferably 10 or more, more preferably 30 or more, further preferably 50 or more, by mol %. By mol %, r may be 95 or less, preferably 94 or less, more preferably 93 or less, further preferably 90 or less. Further, s may be 0 or more, preferably 10 or more, more preferably 30 or more, further preferably 50 or more, by mol %. By mol %, s may be 95 or less, preferably 94 or less, more preferably 93 or less, further preferably 90 or less. Note that, as described above, p, q, r, and s which are the percentages of polymerization units are selected so that p, q, r, and s may be 100 mol % in total. Further, n is an integer of preferably 2 to 270, more preferably 5 to 160.

The surface layer can contain 0.01 to 40 parts by mass of a surface modifier based on 100 parts by mass of a matrix polymer. In this case, both slidability and toner releasability of the surface of a surface layer can be secured. Further, the balance of both properties can be controlled by adjusting the content of the surface modifier within the above range.

The content of the surface modifier may be preferably 0.05 part by mass or more, more preferably 0.1 part by mass or more, further preferably 0.5 part by mass or more in terms of obtaining sufficient effect by adding the surface modifier and the like. Further, the content of the surface modifier may be preferably 30 parts by mass or less, more preferably 10 parts by mass or less, further preferably 9 parts by mass or less, further more preferably 7 parts by mass or less, further much more preferably 5 parts by mass or less in terms of compatibility with a matrix polymer, suppression of bleeding from a matrix polymer, cost, and the like. Note that the content of the surface modifier can be measured, for example, by extracting the surface modifier with a solvent, then subjecting the extract to thermal decomposition GC/MS analysis and NMR analysis to specify the structure of the surface modifier, and then subjecting the whole material to thermal decomposition GC/MS analysis.

In addition, the surface layer can contain a conducting agent in a matrix polymer. Specific examples of the conducting agent include electron conducting agents such as carbon-based conductive materials such as carbon black, carbon nanotubes, and graphite, conductive metal oxides such as barium titanate, c-$TiO_2$, c-ZnO, and c-$SnO_2$ (c- means electrically conductive), and metal nanoparticles; conductive polymers such as polyaniline and polypyrrole; and ion conducting agents such as quaternary ammonium salt, borate, perchlorate, and an ionic liquid.

In addition, the surface layer can optionally contain, in a matrix polymer, various additives such as a reaction catalyst, a filler (inorganic, organic), a coupling agent, a dispersing agent, a leveling agent, a crosslinking agent, a crosslinking auxiliary, a plasticizer, a flame retardant, a defoaming agent, and roughness-forming particles. These additives can be used alone or in combination.

The thickness of the surface layer is not particularly limited, but an optimum thickness can be obtained in consideration of wear resistance, flexibility, and the like. The thickness of the surface layer may be, for example, about 1 to 100 μm.

EXAMPLES

The electrophotographic device members according to Examples will be specifically described using drawings.

Example 1

Figure 2:
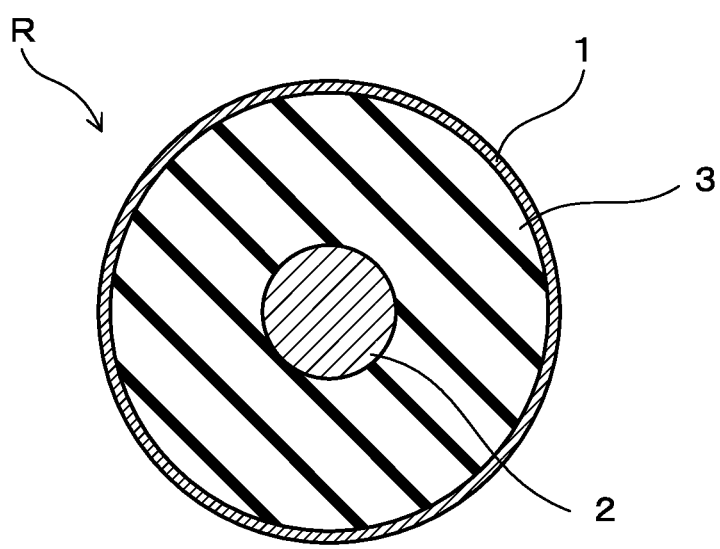
FIG. 2 illustrates the II-II section in FIG. 1.

The rough configuration of the electrophotographic device member according to Example 1 will be described using FIG. 1 to FIG. 3. As illustrated in FIG. 1 and FIG. 2, an electrophotographic device member R is used in an electrophotographic device. Specifically, the electrophotographic device member of this example is a roll-shaped electrically conductive member to be incorporated into an image forming device of an electrophotographic system, which can be used as a developing roll as a developing member or a charging roll as a charging member.

The electrophotographic device member R has a surface layer 1. Specifically, the electrophotographic device member R of this example further has an axis body 2 formed of a core metal and an elastic layer 3 formed of a rubber elastomer having electrical conductivity which is formed along the outer circumferential surface of the axis body 2. However, both the ends of the axis body 2 are in the state where they are projected from both the end surfaces of the elastic layer 3. Further, the surface layer 1 is formed along the outer circumferential surface of the elastic layer 3. When the electrophotographic device member R is used as a developing member, it can be used, for example, in the state where a blade member for charging toner by rubbing or for forming toner layer having a constant thickness is in contact with the surface of the surface layer 1. Further, when the electrophotographic device member R is used as a charging member, it can be used, for example, in the state where a blade member for removing toner remaining on the surface after a fixing step of fixing a toner image to paper is in contact with the surface of the surface layer 1.

Figure 3:
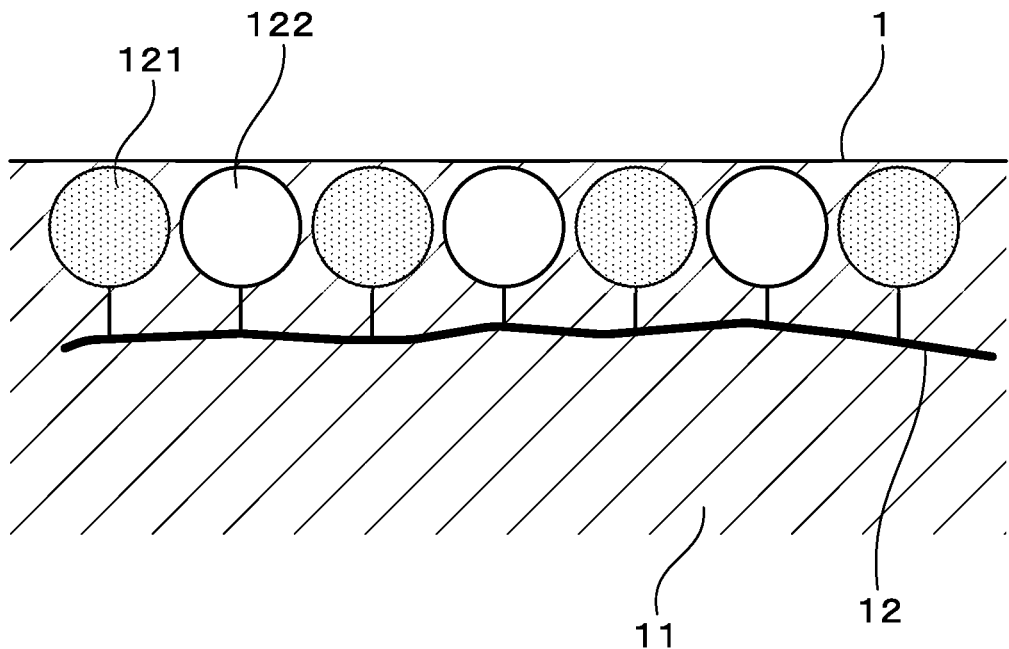
FIG. 3 schematically illustrates the configuration of a surface layer in the electrophotographic device member of Example 1.

As schematically illustrated in FIG. 3, the surface layer 1 has a matrix polymer 11 forming the skeleton of the surface layer 1 and a surface modifier 12 contained in the matrix polymer 11.

Specifically, the matrix polymer 11 is formed of a mixed polymer of thermoplastic polyurethane and thermosetting polyurethane. The surface modifier 12 is composed of a linear copolymer containing, in its molecule, a first polymerization unit derived from a (meth)acrylate having a silicone group 121 and a second polymerization unit derived from a (meth)acrylate having a fluorine-containing group 122. A relatively large number of surface modifiers 12 are present on the surface of the surface layer 1. The surface modifier 12 is contained in an amount in the range of 0.01 to 40 parts by mass based on 100 parts by mass of the matrix polymer 11. Note that an electron conducting agent is added in the surface layer 1 in order to impart electrical conductivity.

Example 2

Figure 4:
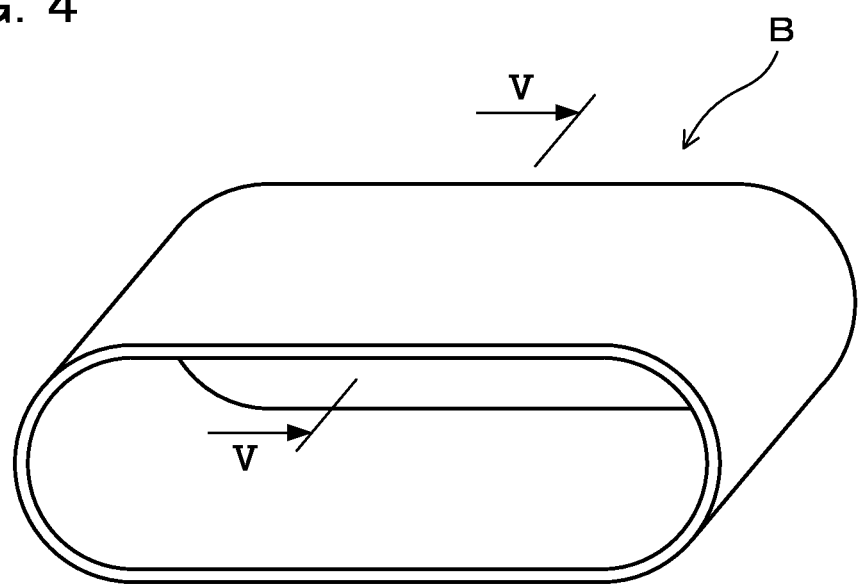
FIG. 4 schematically illustrates the electrophotographic device member of Example 2.
Figure 5:
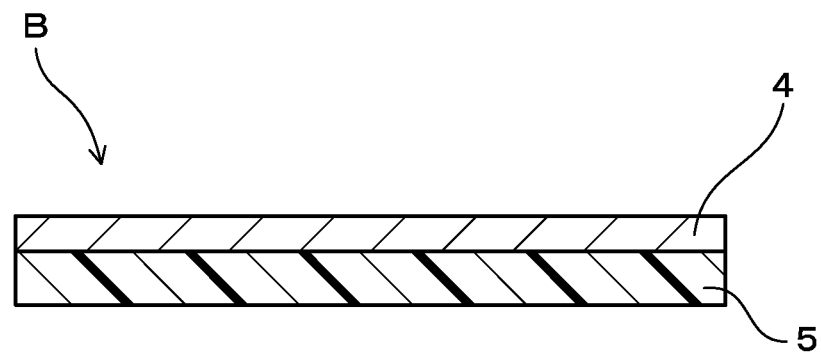
FIG. 5 illustrates the V-V section in FIG. 4.

The rough configuration of the electrophotographic device member according to Example 2 will be described using FIG. 4 and FIG. 5. As illustrated in FIG. 4 and FIG. 5, an electrophotographic device member B is used in an electrophotographic device. Specifically, the electrophotographic device member B of this example is an endless belt-shaped electrically conductive member to be incorporated into an image forming device of an electrophotographic system, which can be used as an intermediate transfer belt as a transferring member.

The electrophotographic device member B has a surface layer 4. Specifically, the electrophotographic device member B of this example further has a cylindrical base layer 5 formed of a resin material having electrical conductivity. Further, the surface layer 4 is formed along the outer circumferential surface of the base layer 5. The electrophotographic device member B can be used, for example, in the state where a blade member for removing toner remaining on the surface after secondarily transferring a toner image to paper is in contact with the surface of the surface layer 5.

Although not illustrated, the surface layer 4 contains a surface modifier in a matrix polymer in the same manner as in FIG. 3 of Example 1.

Specifically, the matrix polymer is mainly composed of rubber. Therefore, the surface layer 4 has rubber elasticity. Since the surface modifier has the same configuration as in Example 1, its description is omitted. Note that an ion conducting agent is added in the surface layer 4 in order to impart electrical conductivity.

Hereinafter, developing roll samples as an electrophotographic device member and developing roll samples of Comparative Examples were made and evaluated. The experimental examples will be described.

Experimental Examples

<Preparation of Surface Modifiers>

Each surface modifier to be incorporated into a matrix polymer in a surface layer was prepared as follows.

Surface Modifier A

To a 100 mL reaction flask, 1.66 g (0.36 mmol) of acrylate-modified silicone oil ("X-22-174DX", manufactured by Shin-Etsu Chemical Co., Ltd.), 5.61 g (13 mmol) of 2-(perfluorohexyl)ethyl acrylate ("R-1620", manufactured by Daikin Industries, Ltd.), 7.37 g (73.64 mmol) of methyl methacrylate (manufactured by Junsei Chemical Co., Ltd.), 1.69 g (13 mmol) of 2-hydroxyethyl methacrylate (manufactured by Tokyo Chemical Industry Co., Ltd.), 1.24 g (4 mmol) of dimethyl 1,1'-azobis(1-cyclohexane carboxylate) ("VE-73", manufactured by Wako Pure Chemical Industries, Ltd.), and 14.38 g of methyl ethyl ketone (MEK) were charged. The contents were subjected to nitrogen bubbling for 5 minutes with stirring and then polymerized for 7 hours at an inner liquid temperature of 80° C.

Note that the acrylate-modified silicone oil is a compound represented by the formula 1, in which $R_1$ and $R_2$ each represent a methyl group. Further, the silicone group contains a polydimethylsiloxane skeleton formed by repetition of a dimethylsiloxane unit, and has a weight average molecular weight of 4200.

Next, 26.64 g of MEK was charged to the resulting mixture to obtain a solution containing a surface modifier A in a solid content of 30%.

The surface modifier A is composed of a linear copolymer containing, in its molecule, a first polymerization unit derived from a (meth)acrylate having a silicone group, a second polymerization unit derived from a (meth)acrylate having a fluorine-containing group, a third polymerization unit derived from a (meth)acrylate having an alkyl group, and a fourth polymerization unit derived from a (meth)acrylate having a hydroxy group. More specifically, the surface modifier A is a compound having a molecular structure represented by formula 5 (wherein $R_1$ and $R_2$ in the first polymerization unit are H and a methyl group, respectively; $R_1$ in the second polymerization unit is H; $R_1$ and $R_2$ in the third polymerization unit are each a methyl group; $R_1$ in the fourth polymerization unit is a methyl group; and p=0.4, q=13, r=73.6, and s=13, by mol %).

Surface Modifier B

To a 100 mL reaction flask, were charged 1.66 g (0.36 mmol) of the acrylate-modified silicone oil, 5.61 g (13 mmol) of the 2-(perfluorohexyl)ethyl acrylate ("R-1620", manufactured by Daikin Industries, Ltd.), 9.44 g (73.64 mmol) of butyl methacrylate (manufactured by Tokyo Chemical Industry Co., Ltd.), 1.69 g (13 mmol) of the 2-hydroxyethyl methacrylate, 1.24 g (4 mmol) of the dimethyl 1,1'-azobis(1-cyclohexane carboxylate), and 16.07 g of methyl ethyl ketone (MEK). The contents were subjected to nitrogen bubbling for 5 minutes with stirring and then polymerized for 7 hours at an inner liquid temperature of 80° C.

Next, 29.76 g of MEK was charged to the resulting mixture to obtain a solution containing a surface modifier B in a solid content of 30%.

The surface modifier B is composed of a linear copolymer containing, in its molecule, a first polymerization unit derived from a (meth)acrylate having a silicone group, a second polymerization unit derived from a (meth)acrylate having a fluorine-containing group, a third polymerization unit derived from a (meth)acrylate having an alkyl group, and a fourth polymerization unit derived from a (meth)acrylate having a hydroxy group, in which the type of the third polymerization unit is different from that of the surface modifier A. More specifically, the surface modifier B is a compound having a molecular structure represented by formula 5 (wherein $R_1$ and $R_2$ in the first polymerization unit are H and a methyl group, respectively; $R_1$ in the second polymerization unit is H; $R_1$ and $R_2$ in the third polymerization unit are a methyl group and a butyl group, respectively; $R_1$ in the fourth polymerization unit is a methyl group; and p=0.4, q=13, r=73.6, and s=13, by mol %).

Surface Modifier C

To a 100 mL reaction flask, were charged 1.66 g (0.36 mmol) of the acrylate-modified silicone oil, 5.61 g (13 mmol) of the 2-(perfluorohexyl)ethyl acrylate ("R-1620", manufactured by Daikin Industries, Ltd.), 8.67 g (86.64 mmol) of the methyl methacrylate, 1.24 g (4 mmol) of the dimethyl 1,1'-azobis(1-cyclohexane carboxylate), and 14.06 g of methyl ethyl ketone (MEK). The contents were subjected to nitrogen bubbling for 5 minutes with stirring and then polymerized for 7 hours at an inner liquid temperature of 80° C.

Next, 26.04 g of MEK was charged to the resulting mixture to obtain a solution containing a surface modifier C in a solid content of 30%.

The surface modifier C is composed of a linear copolymer containing, in its molecule, a first polymerization unit derived from a (meth)acrylate having a silicone group, a second polymerization unit derived from a (meth)acrylate having a fluorine-containing group, and a third polymerization unit derived from a (meth)acrylate having an alkyl group, which is different from the surface modifier A in that the surface modifier C does not have the fourth polymerization unit. More specifically, the surface modifier C is a compound having a molecular structure represented by formula 5 (wherein $R_1$ and $R_2$ in the first polymerization unit are H and a methyl group, respectively; $R_1$ in the second polymerization unit is H; $R_1$ and $R_2$ in the third polymerization unit are each a methyl group; and p=0.4, q=13, r=86.6, and s=0, by mol %).

Surface Modifier D

To a 100 mL reaction flask, were charged 1.66 g (0.36 mmol) of the acrylate-modified silicone oil, 9.97 g (99.64 mmol) of the methyl methacrylate, 1.24 g (4 mmol) of the dimethyl 1,1'-azobis(1-cyclohexane carboxylate), and 10.53 g of methyl ethyl ketone (MEK). The contents were subjected to nitrogen bubbling for 5 minutes with stirring and then polymerized for 7 hours at an inner liquid temperature of 80° C.

Next, 19.5 g of MEK was charged to the resulting mixture to obtain a solution containing a surface modifier D in a solid content of 30%. The surface modifier D is composed of a linear copolymer containing, in its molecule, a first polymerization unit derived from a (meth)acrylate having a silicone group and a third polymerization unit derived from a (meth)acrylate having an alkyl group. The copolymer does not contain, in its molecule, a second polymerization unit derived from a (meth)acrylate having a fluorine-containing group.

Surface Modifier E

To a 100 mL reaction flask, were charged 5.61 g (13 mmol) of the 2-(perfluorohexyl)ethyl acrylate ("R-1620", manufactured by Daikin Industries, Ltd.), 8.71 g (87 mmol) of the methyl methacrylate, 1.24 g (4 mmol) of the dimethyl 1,1'-azobis(1-cyclohexane carboxylate), and 12.73 g of methyl ethyl ketone (MEK). The contents were subjected to nitrogen bubbling for 5 minutes with stirring and then polymerized for 7 hours at an inner liquid temperature of 80° C.

Next, 23.58 g of MEK was charged to the resulting mixture to obtain a solution containing a surface modifier E in a solid content of 30%. The surface modifier E is composed of a linear copolymer containing, in its molecule, a second polymerization unit derived from a (meth)acrylate having a fluorine-containing group and a third polymerization unit derived from a (meth)acrylate having an alkyl group. The copolymer does not contain, in its molecule, a first polymerization unit derived from a (meth)acrylate having a silicone group.

The amount of each polymerization component charged in the synthesis of the surface modifiers is collectively shown in Table 1 below.

<Preparation of Materials for Forming Surface Layer>

As shown in Table 2 to be described below, 10 parts by mass of thermoplastic polyurethane ("Nippolan 5199", manufactured by Nippon Polyurethane Industry Co., Ltd.), 60 parts by mass of polyether diol (trifunctional polypropylene glycol) ("ADEKA POLYETHER P-1000", manufactured by ADEKA CORPORATION), 30 parts by mass of polyisocyanate (HDI type block isocyanurate) ("Coronate L", manufactured by Nippon Polyurethane Industry Co., Ltd.), 3 parts by mass of an electron conducting agent (carbon black) ("Ketchen EC300J", manufactured by Lion Corporation), and a predetermined type and a predetermined amount of each surface modifier formulated as shown in Table 2 were dissolved in MEK so that the concentration may be 20 mass % and sufficiently mixed and dispersed with a three-roll mill. Thereby, each surface layer-forming material was prepared that would be used to make developing roll samples 1 to 8.

Further, a surface layer-forming material to be used to make a developing roll sample 9 was prepared in the same manner as in the preparation of each surface layer-forming material to be used to make the samples 1 to 8 except that an acrylate ester polymer ("PARACRON AS-3000E", OH value: 8.5 mg KOH/g, weight average molecular weight Mw=65000, manufactured by Negami Chemical Industrial Co., Ltd.) was used instead of 10 parts by mass of the thermoplastic polyurethane and 60 parts by mass of the polyether diol.

Furthermore, a surface layer-forming material to be used to make a developing roll sample 10 was prepared in the same manner as in the preparation of each surface layer-forming material to be used to make the samples 1 to 8 except that reactive NBR (NBR having carboxyl groups at both ends) ("CTBN1300X31", reacting group equivalent: 1750 g/mol, weight average molecular weight: Mw=3500, manufactured by PTI Japan Limited) was used instead of 10 parts by mass of the thermoplastic polyurethane and 60 parts by mass of the polyether diol.

<Making of Developing Roll Sample>

An elastic layer-forming material was prepared by mixing conductive silicone rubber ("X-34-264 A/B, mixing mass ratio A/B=1/1", manufactured by Shin-Etsu Chemical Co., Ltd.) with a static mixer.

A solid columnar iron bar having a diameter of 6 mm was provided as an axis body, and an adhesive was applied to the outer circumferential surface. The axis body was set in a hollow space of a mold for forming a roll, and then the elastic layer-forming material prepared as described above was injected into the hollow space and heated at 190° C. for 30 minutes to cure the material, followed by unmolding the cured material. Thereby, a roll-shaped elastic layer (having a thickness of 3 mm) formed of conductive silicone rubber was formed along the outer circumferential surface of the axis body.

Next, each surface layer-forming material prepared as described above was applied to the outer circumferential

TABLE 1

|  |  | Surface modifier | | | | |
|---|---|---|---|---|---|---|
|  |  | A | B | C | D | E |
| Compound used for forming each polymerization unit | (First polymerization unit) Acrylate-modified silicone oil | 1.66 g (0.36 mmol) | 1.66 g (0.36 mmol) | 1.66 g (0.36 mmol) | 1.66 g (0.36 mmol) | — |
|  | (Second polymerization unit) 2-(Perfluorohexyl)ethyl acrylate | 5.61 g (13 mmol) | 5.61 g (13 mmol) | 5.61 g (13 mmol) | — | 5.61 g (13 mmol) |
|  | (Third polymerization unit) Methyl methacrylate | 7.37 g (73.64 mmol) | — | 8.67 g (86.64 mmol) | 9.97 g (99.64 mmol) | 8.71 g (87 mmol) |
|  | Butyl methacrylate | — | 9.44 g (73.64 mmol) | — | — | — |
|  | (Fourth polymerization unit) 2-Hydroxyethyl methacrylate | 1.69 g (13 mmol) | 1.69 g (13 mmol) | — | — | — |
| (Polymerization initiator) Dimethyl 1,1'-azobis(1-cyclohexane carboxylate) |  | 1.24 g (4 mmol) | 1.24 g (4 mmol) | 1.24 g (4 mmol) | 1.24 g (4 mmol) | 1.24 g (4 mmol) | surface of the elastic layer by a roll coating method and then heated at 120° C. for 60 minutes to be cured to form a surface layer (thickness: 15 μm). Thereby, developing roll samples 1 to 10 were made that had a two-layer structure having the surface layer along the outer circumferential surface of the elastic layer. The surface layer contains each surface modifier shown in Table 2 in a mixed polymer of thermoplastic polyurethane and thermosetting polyurethane, or an acrylate polymer, or crosslinked NBR, which forms the skeleton of the surface layer.

—Slidability—

To the surface of a developing roll sample fixed on a stage of a static/dynamic friction coefficient measuring instrument ("Triboster500", manufactured by Kyowa Interface Science Co., Ltd.), that is, to the surface of a surface layer was applied 50 g of a normal load W with a contactor (made from a steel ball having a diameter of 3 mm). In this state, the stage was horizontally moved 1 cm at a moving speed of 7.5 mm/s. Thereby, the initial dynamic friction coefficient μk (F/W) on the surface of the surface layer of the developing roll sample was calculated from the frictional force F generated between the developing roll sample and the contactor.

The case where the dynamic friction coefficient μk was 1.5 or less was rated as "A", noting that the surface of the surface layer is excellent in slidability. The case where the dynamic friction coefficient μk was 1.5 or more and less than 2 was rated as "B", noting that the surface of the surface layer has good slidability. The case where the dynamic friction coefficient μk was more than 2 was rated as "C", noting that the surface of the surface layer has large frictional force and poor slidability.

—Toner Releasability—

Each surface layer-forming material prepared as described above was heated and cured under the same conditions as in forming the surface layer to make each sheet-shaped test piece (having a thickness of 15 μm). Next, a fixed quantity of toner for a cartridge in a digital full-color multifunction machine ("DocuCentre-IV C2260", manufactured by Fuji Xerox Co., Ltd.) employing an electrophotographic system was spread over the surface of each test piece. Next, each of the test piece on which the toner was spread was set to a centrifuge. The test piece was applied 12000 G, and the amount of the toner remaining on the test piece was then evaluated by image processing. The case where the residual area of toner in an image was less than 30% was rated as "A", noting that the surface is excellent in toner releasability; the case where the residual area of toner in an image was 30% or more and less than 50% was rated as "B", noting that the surface has toner releasability; and the case where the residual area of toner in an image was more than 50% was rated as "C", noting that the surface does not have toner releasability.

The detailed configurations and evaluation results of each developing roll sample are collectively shown in Table 2 below.

TABLE 2

| | | Sample | | | | | | | | | |
|---|---|---|---|---|---|---|---|---|---|---|---|
| | | 1 | 2 | 3 | 4 | 5 | 6 | 7 | 8 | 9 | 10 |
| Formulation of materials for forming surface layer (parts by mass) | Thermoplastic polyurethane | — | — | — | 10 | — | — | — | — | — | — |
| | Polyether diol | — | — | — | 60 | — | — | — | — | — | — |
| | Acrylate ester polymer | — | — | — | — | — | — | — | — | 70 | — |
| | Reactive NBR | — | — | — | — | — | — | — | — | — | 70 |
| | Polyisocyanate | — | — | — | 30 | — | — | — | — | — | — |
| | Electron conducting agent | — | — | — | 3 | — | — | — | — | — | — |
| | Surface modifier A | 1 | — | — | — | — | — | — | — | 1 | 1 |
| | Surface modifier B | — | 1 | — | — | — | — | — | — | — | — |
| | Surface modifier C | — | — | 1 | — | — | — | — | — | — | — |
| | Surface modifier D | — | — | — | 1 | — | 0.75 | 0.5 | 0.25 | — | — |
| | Surface modifier E | — | — | — | — | 1 | 0.25 | 0.5 | 0.75 | — | — |
| Evaluation | Slidability Dynamic friction coefficient μk of the surface of surface layer | 0.67 A | 0.74 A | 0.7 A | 0.5 A | 2.1 C | 1.6 B | 2 C | 2.1 C | 0.63 A | 0.95 A |
| | Toner releasability | A | A | A | C | A | C | C | B | A | A |

Table 2 reveals the following.

The developing roll of sample 4 contains, in its molecule, a first polymerization unit derived from a (meth)acrylate having a silicone group. However, the silicone-based surface modifier D which does not contain a second polymerization unit derived from a (meth)acrylate having a fluorine-containing group is used in the developing roll of sample 4. Therefore, the developing roll of sample 4 has poor toner releasability because the toner adhered to the surface of the surface layer of the roll is not easily released therefrom.

The developing roll of sample 5 contains, in its molecule, a second polymerization unit derived from a (meth)acrylate having a fluorine-containing group. However, the fluorine-based surface modifier E which does not contain a first polymerization unit derived from a (meth)acrylate having a silicone group is used in the developing roll of sample 5. For this reason, the developing roll of sample 5 has an extremely large dynamic friction coefficient of the surface of the surface layer and is poor in slidability of the surface of the surface layer.

The developing rolls of samples 6 to 8 represent a case in which the silicone-based surface modifier D and the fluorine-based surface modifier E are incorporated in combination into a matrix polymer. However, these results show that the effect of each surface modifier cannot sufficiently be exhibited even when both the surface modifiers are used in combination, and it is difficult to impart both properties of slidability and toner releasability of the surface of a surface layer. This is probably because when both the silicone-based surface modifier and the fluorine-based surface modifier are added to a surface layer, these surface modifiers are hardly mixed with each other since they are poorly compatible with each other. Further, even if both the surface modifiers are allowed to coexist on the surface of a surface layer by controlling a certain control factor, both the surface modifiers are basically those which are hardly mixed with each other. For this reason, large blocks of any one or both of the surface modifiers are probably produced to easily generate unevenness and the like in properties.

On the other hand, all the developing rolls of sample 1 to sample 3 at least contain any of the surface modifiers A, B, and C composed of a copolymer containing, in its molecule, a first polymerization unit derived from a (meth)acrylate having a silicone group and a second polymerization unit derived from a (meth)acrylate having a fluorine-containing group, in a matrix polymer in a surface layer.

For this reason, the developing rolls of sample 1 to sample 3 were able to attain both properties of slidability and toner releasability of the surface of a surface layer. This is because, since a surface modifier incorporated into a matrix polymer forming the skeleton of a surface layer contains, in its molecule, a first polymerization unit derived from a (meth)acrylate having a silicone group and a second polymerization unit derived from a (meth)acrylate having a fluorine-containing group, the surface modifier was able to force the silicone group of the first polymerization unit and the fluorine-containing group of the second polymerization unit to be present on the surface of the surface layer. Further, it is found that the above effect can be obtained even when the amount of a surface modifier added is relatively small based on the amount of a matrix polymer.

Further, the developing rolls of sample 9 and sample 10 are examples in which the matrix polymer forming a surface layer is different as compared with the developing roll of sample 1. Also in this case, it is found that the same effect as that of the developing roll of sample 1 is obtained.

Although Examples of the present invention have been described in detail, the present invention is not limited to these Examples, and various modifications can be made within the scope that does not impair the effects of the present invention.

The invention claimed is:

1. An electrophotographic device member comprising a surface layer for use in an electrophotographic device,
   the surface layer comprising:
   a matrix polymer forming a skeleton of the surface layer; and
   a surface modifier contained in the matrix polymer, and
   the surface modifier being composed of a copolymer comprising, in its molecule, a first polymerization unit derived from a (meth)acrylate having a silicone group, and a second polymerization unit derived from a (meth) acrylate having a fluorine-containing group.

2. The electrophotographic device member according to claim 1, wherein the silicone group comprises a polydimethylsiloxane skeleton formed by repetition of a dimethylsiloxane unit, and the fluorine-containing group is a perfluoroalkyl group.

3. The electrophotographic device member according to claim 1, wherein the (meth)acrylate having a silicone group is a compound represented by the following formula 1, and the (meth)acrylate having a fluorine-containing group is a compound represented by the following formula 2:

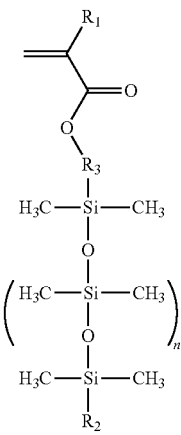

(Formula 1)

(wherein $R_1$ represents H or $CH_3$;
$R_2$ represents an alkyl group;
$R_3$ represents an alkyl group or

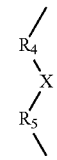

$R_4$ and $R_5$ each represent an alkyl group;
X represents an ester bond, a urethane bond, a urea bond, or an amide bond; and
n represents an integer of 2 to 270)

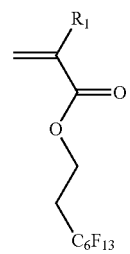

(Formula 2)

(wherein $R_1$ represents H or $CH_3$).

4. The electrophotographic device member according to claim 1, wherein the surface modifier further comprises, in its molecule, a third polymerization unit derived from a (meth)acrylate having an alkyl group and/or a fourth polymerization unit derived from a (meth)acrylate having a hydroxy group.

5. The electrophotographic device member according to claim 2, wherein the surface modifier further comprises, in its molecule, a third polymerization unit derived from a (meth)acrylate having an alkyl group and/or a fourth polymerization unit derived from a (meth)acrylate having a hydroxy group.

6. The electrophotographic device member according to claim 3, wherein the surface modifier further comprises, in its molecule, a third polymerization unit derived from a (meth)acrylate having an alkyl group and/or a fourth polymerization unit derived from a (meth)acrylate having a hydroxy group.

7. The electrophotographic device member according to claim 4, wherein the (meth)acrylate having the alkyl group is methyl methacrylate or butyl methacrylate, and the (meth) acrylate having the hydroxy group is hydroxyethyl methacrylate.

8. The electrophotographic device member according to claim 5, wherein the (meth)acrylate having the alkyl group is methyl methacrylate or butyl methacrylate, and the (meth) acrylate having the hydroxy group is hydroxyethyl methacrylate.

9. The electrophotographic device member according to claim 6, wherein the (meth)acrylate having the alkyl group is methyl methacrylate or butyl methacrylate, and the (meth) acrylate having the hydroxy group is hydroxyethyl methacrylate.

10. The electrophotographic device member according to claim 1, wherein the surface modifier further comprises, in its molecule, a fifth polymerization unit derived from a (meth)acrylate having a functional group different from the silicone group and the fluorine-containing group.

11. The electrophotographic device member according to claim 2, wherein the surface modifier further comprises, in its molecule, a fifth polymerization unit derived from a (meth)acrylate having a functional group different from the silicone group and the fluorine-containing group.

12. The electrophotographic device member according to claim 3, wherein the surface modifier further comprises, in its molecule, a fifth polymerization unit derived from a (meth)acrylate having a functional group different from the silicone group and the fluorine-containing group.

13. The electrophotographic device member according to claim 4, wherein the surface modifier further comprises, in its molecule, a fifth polymerization unit derived from a (meth)acrylate having a functional group different from the silicone group and the fluorine-containing group.

14. The electrophotographic device member according to claim 5, wherein the surface modifier further comprises, in its molecule, a fifth polymerization unit derived from a (meth)acrylate having a functional group different from the silicone group and the fluorine-containing group.

15. The electrophotographic device member according to claim 6, wherein the surface modifier further comprises, in its molecule, a fifth polymerization unit derived from a (meth)acrylate having a functional group different from the silicone group and the fluorine-containing group.

16. The electrophotographic device member according to claim 1, which is a developing member, a charging member, or a transferring member to be incorporated into an image forming device of an electrophotographic system.

17. The electrophotographic device member according to claim 2, which is a developing member, a charging member, or a transferring member to be incorporated into an image forming device of an electrophotographic system.

18. The electrophotographic device member according to claim 3, which is a developing member, a charging member, or a transferring member to be incorporated into an image forming device of an electrophotographic system.

19. An electrophotographic device member comprising a surface layer for use in an electrophotographic device,
the surface layer comprising:
a matrix polymer forming a skeleton of the surface layer; and
a surface modifier contained in the matrix polymer, and
the surface modifier being at least one kind selected from
a compound having a molecular structure represented by the following formula 5:

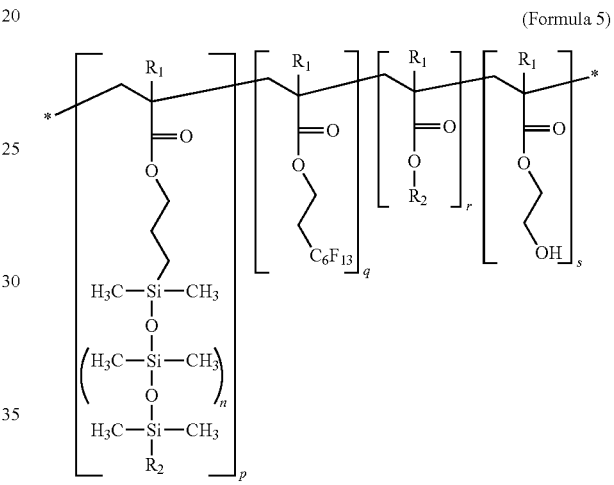

(Formula 5)

(wherein $R_1$ represents H or $CH_3$;
$R_2$ represents an alkyl group;
p is 0.01 to 60, q is 0.01 to 60, r is 0 to 95, and s is 0 to 95, by mol %; and
n is an integer of 2 to 270).

20. The electrophotographic device member according to claim 19, which is a developing member, a charging member, or a transferring member to be incorporated into an image forming device of an electrophotographic system.

* * * * *